US012312976B2

(12) United States Patent
Kim et al.

(10) Patent No.: US 12,312,976 B2
(45) Date of Patent: May 27, 2025

(54) GAS TURBINE BLADE HAVING SHELF SQUEALER TIP

(71) Applicants: AGENCY FOR DEFENSE DEVELOPMENT, Daejeon (KR); INDUSTRY-ACADEMIC COOPERATION FOUNDATION, YONSEI UNIVERSITY, Seoul (KR)

(72) Inventors: Jeong-Woo Kim, Daejeon (KR); Hyung-Hee Cho, Seoul (KR); Joo-Hyoung Lee, Seoul (KR); Min-Ho Bang, Seoul (KR); Jeong-Ju Kim, Seoul (KR); Seung-Yeong Choi, Seoul (KR); Tae-Hyun Kim, Seoul (KR); Hee-Seung Park, Seoul (KR)

(73) Assignees: AGENCY FOR DEFENSE DEVELOPMENT, Daejeon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/557,690

(22) PCT Filed: May 4, 2022

(86) PCT No.: PCT/KR2022/006410

§ 371 (c)(1),
(2) Date: Oct. 27, 2023

(87) PCT Pub. No.: WO2022/235076

PCT Pub. Date: Nov. 10, 2022

(65) Prior Publication Data

US 2024/0229652 A1 Jul. 11, 2024

(30) Foreign Application Priority Data

May 4, 2021 (KR) ........................ 10-2021-0057902

(51) Int. Cl.
*F01D 5/20* (2006.01)
*F01D 5/14* (2006.01)
*F01D 5/18* (2006.01)

(52) U.S. Cl.
CPC ................. *F01D 5/20* (2013.01); *F01D 5/14* (2013.01); *F01D 5/141* (2013.01); *F01D 5/18* (2013.01);

(Continued)

(58) Field of Classification Search
CPC ... F01D 5/14; F01D 5/141; F01D 5/18; F01D 5/20; F05D 2220/32; F05D 2240/307; F05D 2240/55; F05D 2260/20
See application file for complete search history.

(56) References Cited

U.S. PATENT DOCUMENTS 4,424,001 A * 1/1984 North ........................ F01D 5/20 415/173.5
6,059,530 A * 5/2000 Lee ........................... F01D 5/20 416/96 A (Continued)

FOREIGN PATENT DOCUMENTS

| | | |
|---|---|---|
| CN | 112240228 A | 1/2021 |
| JP | 2002-235503 A | 8/2002 |
| KR | 10-1509384 B1 | 4/2015 |

OTHER PUBLICATIONS

Search Report, mailed Aug. 10, 2022, for International Application No. PCT/KR2022/006410.

(Continued)

*Primary Examiner* — Audrey B. Walter
(74) *Attorney, Agent, or Firm* — LRK PATENT LAW FIRM

(57) ABSTRACT

The present invention relates to a gas turbine blade having a shelf squealer tip, the gas turbine blade including an airfoil-shaped blade housing, and a squealer tip extending (Continued)

from an edge portion of a tip surface that is an end surface of the blade housing, in which the squealer tip is formed only on a part of the edge portion of the tip surface. According to the present invention, it is possible to maximize film-cooling performance on the tip surface and additionally reduce an aerodynamic loss by suppressing high-temperature main flow reattachment and swirl flow generation on the tip surface.

3 Claims, 11 Drawing Sheets

(52) U.S. Cl.
CPC .... *F05D 2220/32* (2013.01); *F05D 2240/307* (2013.01); *F05D 2240/55* (2013.01); *F05D 2260/20* (2013.01)

(56) References Cited

U.S. PATENT DOCUMENTS

| | | | | |
|---|---|---|---|---|
| 6,422,821 | B1 * | 7/2002 | Lee | F01D 5/20 416/224 |
| 8,414,262 | B2 * | 4/2013 | Hada | F01D 5/20 416/224 |
| 8,801,377 | B1 * | 8/2014 | Liang | F01D 5/186 416/97 R |
| 2004/0126236 | A1 | 7/2004 | Lee et al. | |
| 2006/0257257 | A1 | 11/2006 | Deschamps et al. | |
| 2012/0076653 | A1 * | 3/2012 | Beeck | F01D 5/20 416/95 |
| 2019/0368359 | A1 | 12/2019 | Quach et al. | |

OTHER PUBLICATIONS

Written Opinion, mailed Aug. 10, 2022, for International Application No. PCT/KR2022/006410.

* cited by examiner

GAS TURBINE BLADE HAVING SHELF SQUEALER TIP

TECHNICAL FIELD

The present invention relates to a gas turbine blade, and more particularly, to a gas turbine blade having a shelf squealer tip for coping with high-temperature vulnerability.

BACKGROUND ART

A gas turbine refers to a rotary heat engine that operates a turbine by using high-temperature, high-pressure combustion gas. The gas turbine includes a compressor and a combustor into which air compressed by the compressor is introduced, and the turbine is rotated by the high-temperature, high-pressure combustion gas combusted by the combustor.

A gas turbine blade 10 illustrated in FIG. 1 is operated in a high-temperature environment, which causes more frequent damage to the gas turbine blade 10 than other high-temperature components of the gas turbine. A blade tip is a part most vulnerable to damage among the components of the gas turbine blade. This is because a high thermal load occurs on the tip at which the high-temperature gas passes through a gap between a shroud casing and the blade. In order to prevent the above-mentioned problem, a squealer tip 11 illustrated in FIG. 1 is applied to the blade to reduce a leak of the high-temperature gas by increasing flow resistance, like a labyrinth seal.

Recently, as illustrated in FIG. 2, a shelf squealer tip has been applied to a gas turbine blade 20 in order to reduce a thermal load and an aerodynamic loss on a tip surface. The shelf squealer tip has a shape made by partially moving a rim 21 of a pressure surface inward from the tip surface, and film-cooling holes 23 for cooling the tip surface are applied to a shelf region 22 formed by the movement of the rim.

FIG. 3 is a view illustrating a high-temperature flow in the vicinity of the tip surface when the shelf squealer tip is applied. The high-temperature flow passes over a rim of a leading edge and is reattached to an inner portion of the tip surface, and then the high-temperature flow flows in a tip cavity while forming a swirl flow. For this reason, a thermal load on the leading edge, which is a point to which the flow is reattached, increases, film-cooling fluids are mixed, and cooling performance significantly decreases along the leading edge and the pressure surface.

FIG. 4 illustrates a distribution of a thermal load (Nusselt number) on the tip surface, and FIG. 5 illustrates film-cooling effectiveness on the tip surface. With reference to FIGS. 4 and 5, the concentration of the thermal load on the leading edge and the non-uniform cooling characteristics cause thermal stress on the tip surface, which adversely affects the lifespan of the turbine blade.

The above information disclosed in the related art is only for enhancement of understanding of the background of the present invention and therefore it may contain information that does not form the related art that is already known to a person of ordinary skill in the art.

DISCLOSURE

Technical Problem

The present invention has been made in an effort to solve the above-mentioned problem, and an object of the present invention is to provide a gas turbine blade having a shelf squealer tip, which is capable of maximizing film-cooling performance on a tip surface and additionally reducing an aerodynamic loss by suppressing high-temperature main flow reattachment and swirl flow generation on the tip surface.

Technical Solution

A gas turbine blade having a shelf squealer tip according to an aspect of the present invention includes an airfoil-shaped blade housing, and a squealer tip extending in a length direction of the blade housing from an edge portion of a tip surface that is an end surface of the blade housing, in which the squealer tip is not formed on a part of the edge portion of the tip surface.

Further, the squealer tip may include a suction surface-side squealer tip extending from the edge portion of the tip surface at a side adjacent to a suction surface of the blade housing, and a pressure surface-side squealer tip extending from the edge portion of the tip surface at a side adjacent to a pressure surface of the blade housing.

In addition, the pressure surface-side squealer tip may not be formed on a part of the edge portion of the tip surface at the side adjacent to the pressure surface.

Further, the pressure surface-side squealer tip may not be formed by a predetermined length from an end of a leading edge of the blade housing on the edge portion of the tip surface at the side adjacent to the pressure surface.

Further, a plurality of cooling holes may be formed on the edge portion of the tip surface on which the pressure surface-side squealer tip is not formed.

Further, the pressure surface-side squealer tip may be formed to be spaced apart from an edge of the tip surface at a predetermined interval.

In addition, the plurality of cooling holes may be formed in the tip surface in a separation space defined by the pressure surface-side squealer tip and the edge of the tip surface.

Next, a gas turbine blade having a shelf squealer tip according to another aspect of the present invention includes an airfoil-shaped blade housing, and a squealer tip extending in a length direction of the blade housing from an edge portion of a tip surface that is an end surface of the blade housing, in which a part of the squealer tip is formed to be spaced apart from an edge of the tip surface at a predetermined interval.

Further, the squealer tip may not be formed on apart from the edge portion of the tip surface.

In addition, the squealer tip may not be formed on a part of the edge portion of the tip surface at a side adjacent to a pressure surface of the blade housing.

Further, a plurality of cooling holes may be formed in an edge portion of the tip surface at the side adjacent to the pressure surface.

In addition, the plurality of cooling holes may be formed in a region in which the squealer tip is not formed in the edge portion of the tip surface at the side adjacent to the pressure surface and a region in which the squealer tip is spaced apart from the edge of the tip surface at the side adjacent to the pressure surface.

Advantageous Effects

According to the gas turbine blade having a shelf squealer tip of the present invention, the film-cooling fluid is sprayed from the leading edge, such that a flow entering the blade is not attached to an inner portion of the tip surface. In addition, unlike the related art, complicated flow characteristics are not exhibited, except that a flow leaking through the tip gap develops into a tip leakage vortex.

Therefore, the high-temperature flow is relatively less introduced because of the film-cooling fluid, such that high film-cooling performance is exhibited. In particular, the film-cooling effectiveness on the leading edge region, which is a region of the turbine blade in which the most thermal load is concentrated, is significantly improved in comparison with the related art.

Therefore, damage to the blade tip region may be prevented by the improvement on cooling performance on the tip surface, the lifespan may be improved, and the efficiency of the gas turbine may be improved by the reduction in aerodynamic loss.

MODE FOR INVENTION

In order to sufficiently understand the present invention, advantages in operation of the present invention, and the object to be achieved by carrying out the present invention, reference needs to be made to the accompanying drawings for illustrating an exemplary embodiment of the present invention and contents disclosed in the accompanying drawings.

Further, in the description of the present invention, the repetitive descriptions of publicly-known related technologies will be reduced or omitted when it is determined that the descriptions may unnecessarily obscure the subject matter of the present invention.

Figure 6:
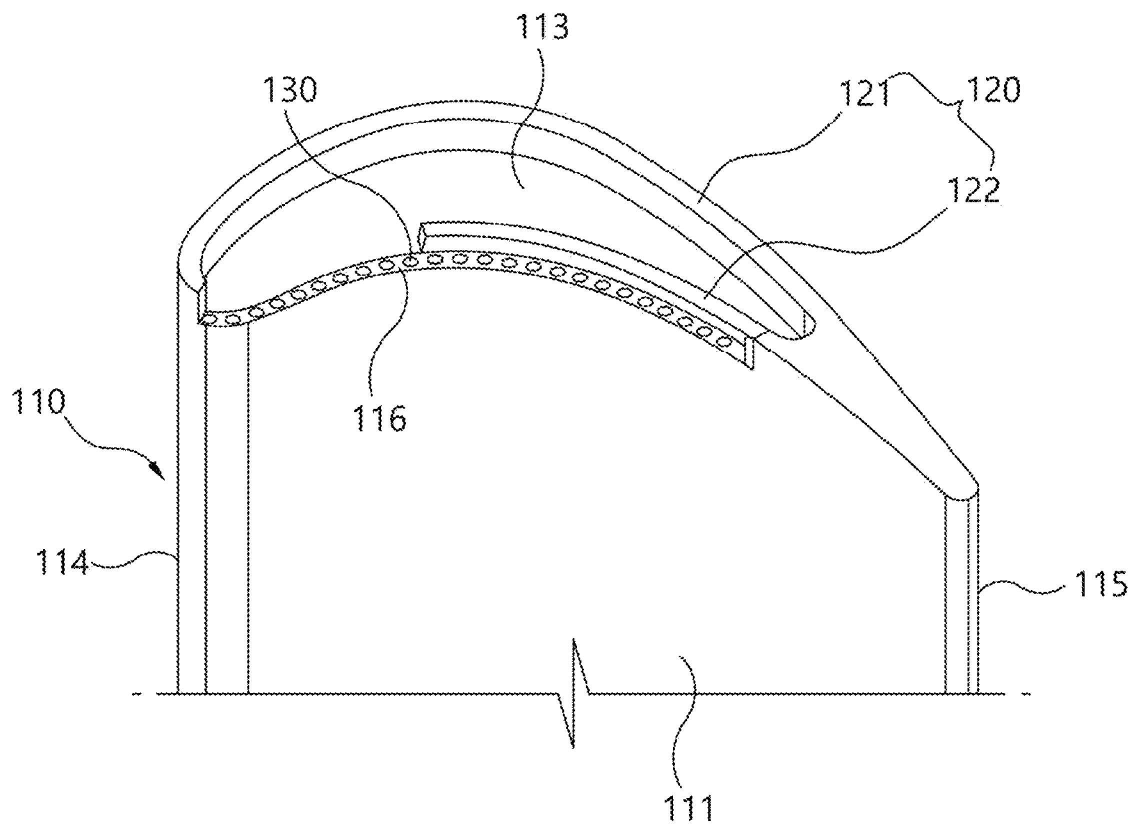
FIG. 6 is a view illustrating a gas turbine blade having a shelf squealer tip according to the present invention.
Figure 7:
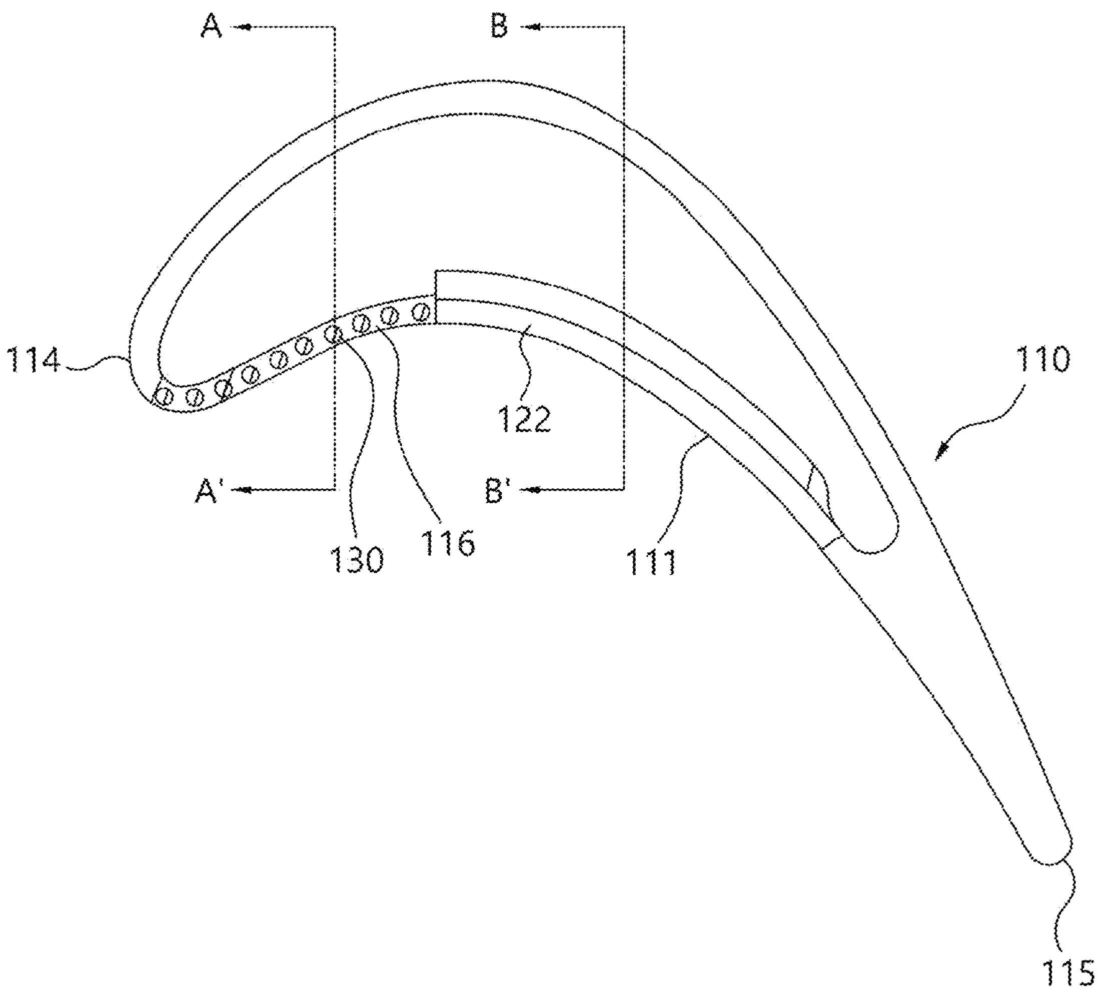
FIG. 7 is a view illustrating a planar shape of the gas turbine blade having a shelf squealer tip according to the present invention.
Figure 8:
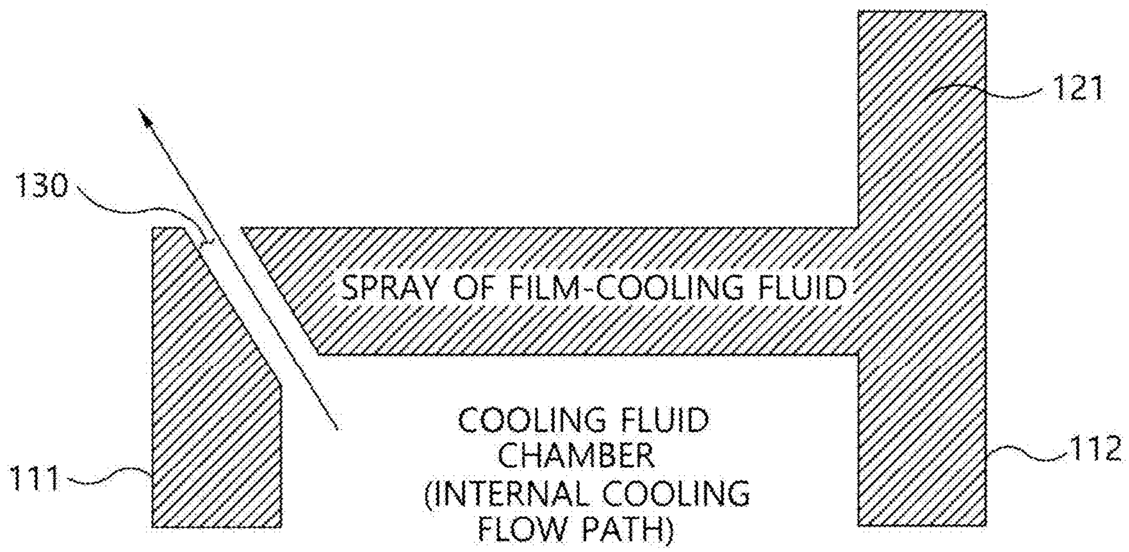
FIG. 8 is a view illustrating a cross-sectional shape taken along line A-A' in FIG. 7.
Figure 9:
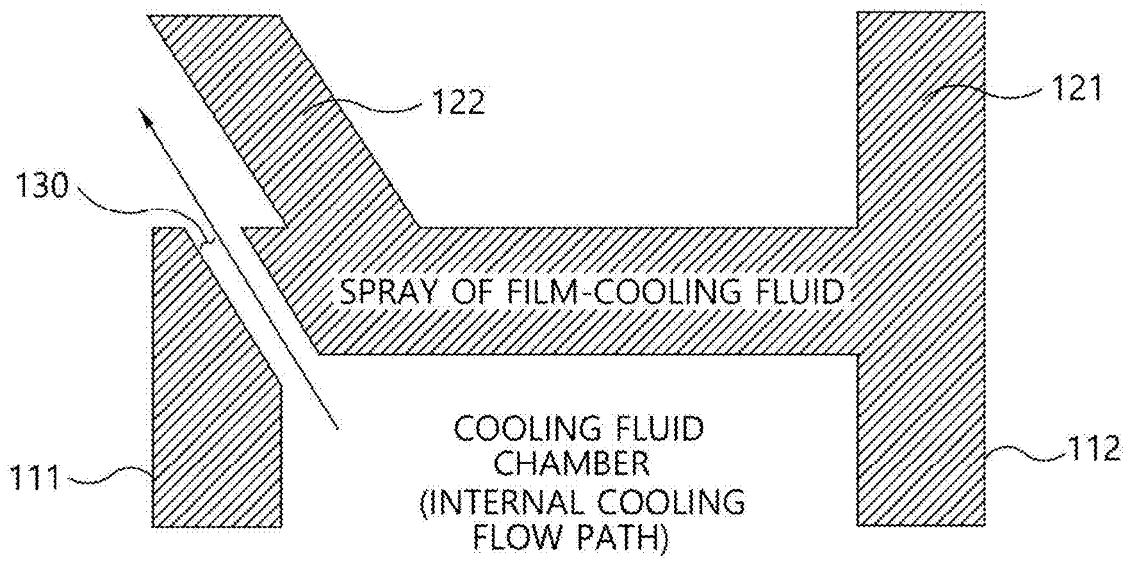
FIG. 9 is a view illustrating a cross-sectional shape taken along line B-B' in FIG. 7.

FIG. 6 is a view illustrating a gas turbine blade having a shelf squealer tip according to the present invention, and FIG. 7 is a view illustrating a planar shape of the gas turbine blade having a shelf squealer tip according to the present invention. Further, FIG. 8 is a view illustrating a cross-sectional shape taken along line A-A' in FIG. 7, and FIG. 9 is a view illustrating a cross-sectional shape taken along line B-B' in FIG. 7.

Hereinafter, a gas turbine blade having a shelf squealer tip according to an embodiment of the present invention will be described with reference to FIGS. 6 to 9.

The gas turbine blade having a shelf squealer tip according to the embodiment of the present invention includes an airfoil-shaped blade housing 110, a squealer tip 120 extending from the blade housing 110, and cooling holes 130 formed in a shelf portion 116 defined by the squealer tip 120.

Therefore, a tip surface 113 may be cooled as a cooling fluid is discharged through the cooling hole 130 from a cooling fluid chamber (or internal cooling flow path) formed in the blade housing 110.

The shape of the blade housing 110 is not limited to the shape illustrated in the drawings, and the blade housing 110 may have an airfoil shape or a shape similar to the airfoil shape.

In addition, a leading edge 114 may have a relatively large width, and a trailing edge 115 may have a relatively small width.

Further, one of two opposite surfaces of the blade housing 110 is a pressure surface 111 (pressure side), and the other of the two opposite surfaces is a suction surface 112 (suction side).

The squealer tip 120 extends and protrudes by a predetermined height in a length direction of the blade from a periphery of the tip surface 113 that is an end of the blade housing 110.

This is to suppress a leak of a high-temperature flow through a tip gap and minimize a flow reattached to the tip surface 113 of the blade. To this end, the shelf portion and the cooling hole 130 are provided.

That is, the squealer tip 120 may protrude from an edge portion of the tip surface 113, and the squealer tip 120 may be divided into a suction surface-side squealer tip 121 protruding from an edge portion of the tip surface 113 at a side adjacent to the suction surface 112, and a pressure surface-side squealer tip 122 protruding from an edge portion of the tip surface 113 at a side adjacent to the pressure surface 111.

The suction surface-side squealer tip 121 protrudes to have a length corresponding to an overall width of the suction surface 112, whereas the pressure surface-side squealer tip 122 protrudes to have only a length corresponding to a predetermined length from the trailing edge 115. A disconnection portion is formed so that the squealer tip is not formed by a predetermined length from the end of the leading edge 114.

Further, the pressure surface-side squealer tip 122 protrudes to be spaced apart from the edge of the tip surface 113 at a predetermined interval without extending from the pressure surface 111, and the pressure surface-side squealer tip 122 protrudes to be inclined outward and upward with respect to the tip surface 113.

Therefore, the shelf portion 116 is formed on the tip surface 113 at the side adjacent to the pressure surface 111. That is, the shelf portion 116 is a separation space defined by the disconnection portion, in which the pressure surface-side squealer tip 122 is not formed, the edge of the pressure surface-side squealer tip 122, and the tip surface 113.

Further, the plurality of cooling holes 130 is formed and arranged in a row on the shelf portion 116.

As described above, the present invention provides the shelf squealer tip in which the disconnected rim is applied to the pressure surface 111 in order to maximize the film-cooling performance on the tip surface 113 and additionally reduce the aerodynamic loss by suppressing the high-temperature main flow reattachment and swirl flow generation on the tip surface 113.

That is, unlike the related art, according to the present invention, the rim disposed adjacent to the leading edge 114 of the pressure surface 111 is disconnected, and the cooling holes 130 are additionally disposed in the corresponding portion to protect the leading edge 114 exposed as the rim is disconnected. The portion, which is disposed adjacent to the pressure surface 111 and is not disconnected, has a shape having the inclined rim.

Figure 10:
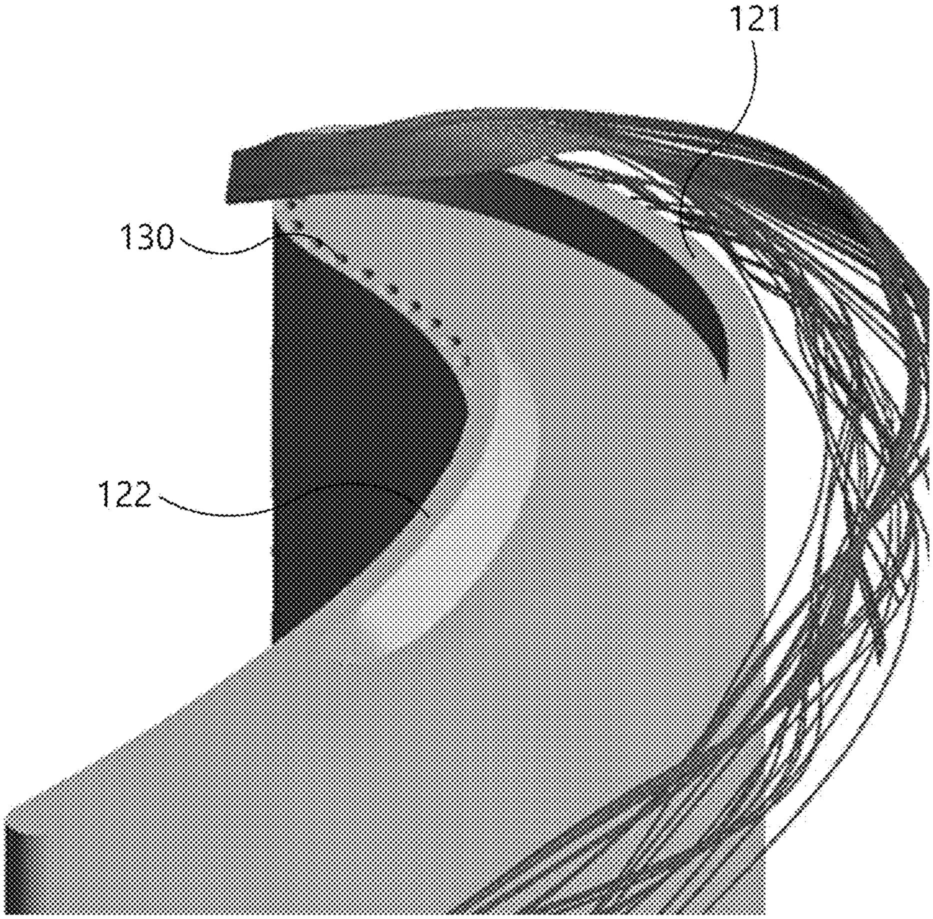
FIG. 10 is a view illustrating flow characteristics in the vicinity of a tip surface made by the gas turbine blade having a shelf squealer tip of the present invention.

FIG. 10 is a view illustrating flow characteristics in the vicinity of the tip surface made by the gas turbine blade having a shelf squealer tip of the present invention.

Figure 1:
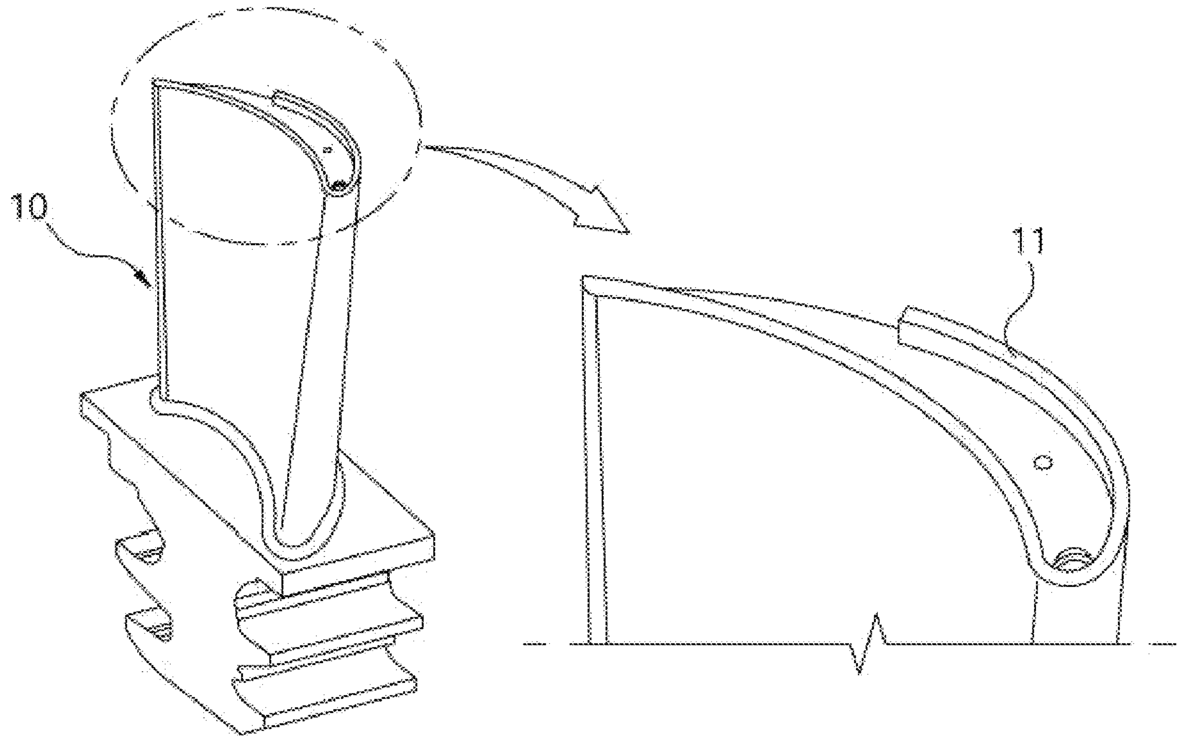
FIG. 1 (PRIOR ART)
FIGS. 1 and 2 are views illustrating examples of gas turbine blades in the related art.
Figure 2:
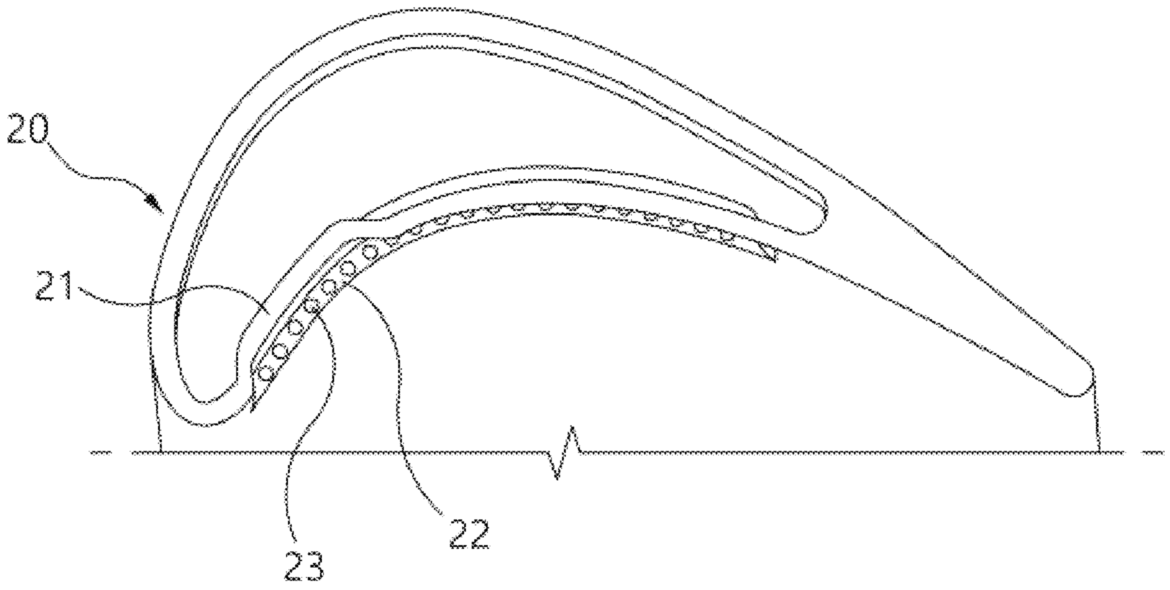
FIG. 2 (PRIOR ART)
Figure 3:
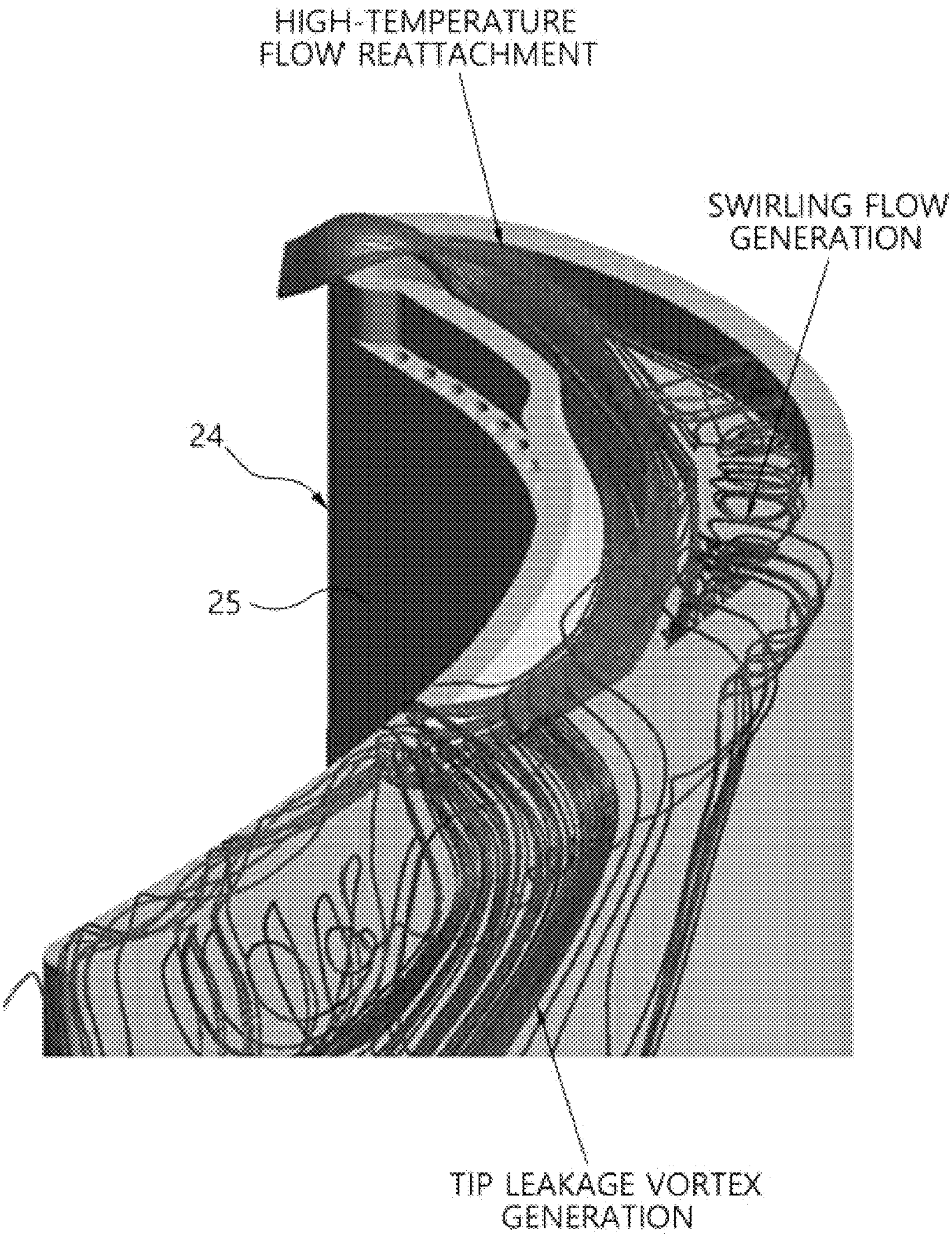
FIG. 3 (PRIOR ART)
FIGS. 3 to 5 are views illustrating results of analyzing the gas turbine blade in the related art illustrated in FIG. 2.
Figure 4:
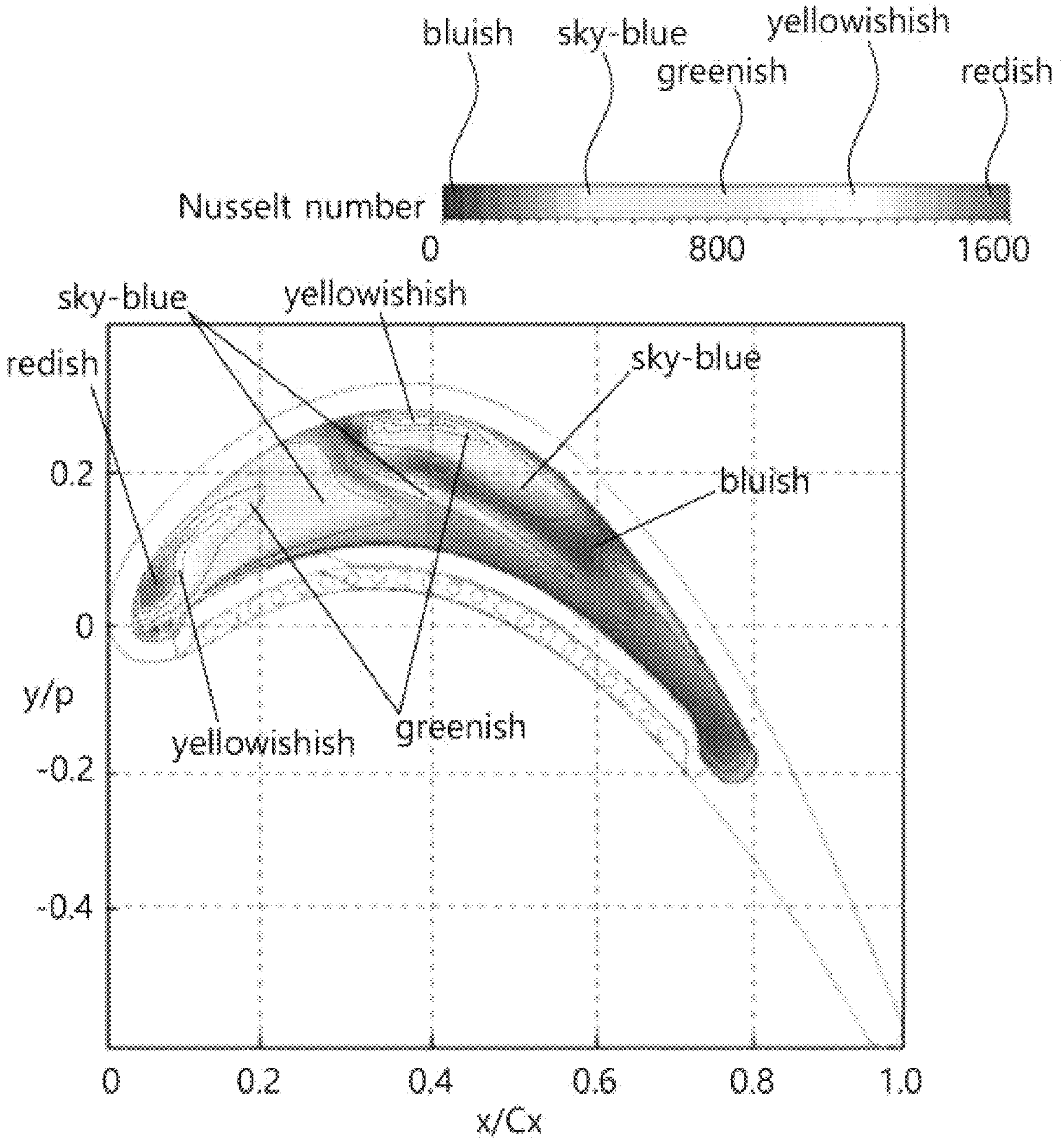
FIG. 4 (PRIOR ART)

In comparison with the related art illustrated in FIG. 3 described above, complicated flow characteristics are exhibited in the tip surface in the related art because a flow passes over the rim of the leading edge and then is reattached to the inner portion of the tip surface while forming a swirl flow. However, according to the present invention, the film-cooling fluid is sprayed from the leading edge, such that a flow entering the blade is not attached to an inner portion of the tip surface. In addition, unlike the related art, complicated flow characteristics are not exhibited, except that a flow leaking through the tip gap develops into a tip leakage vortex.

Figure 11:
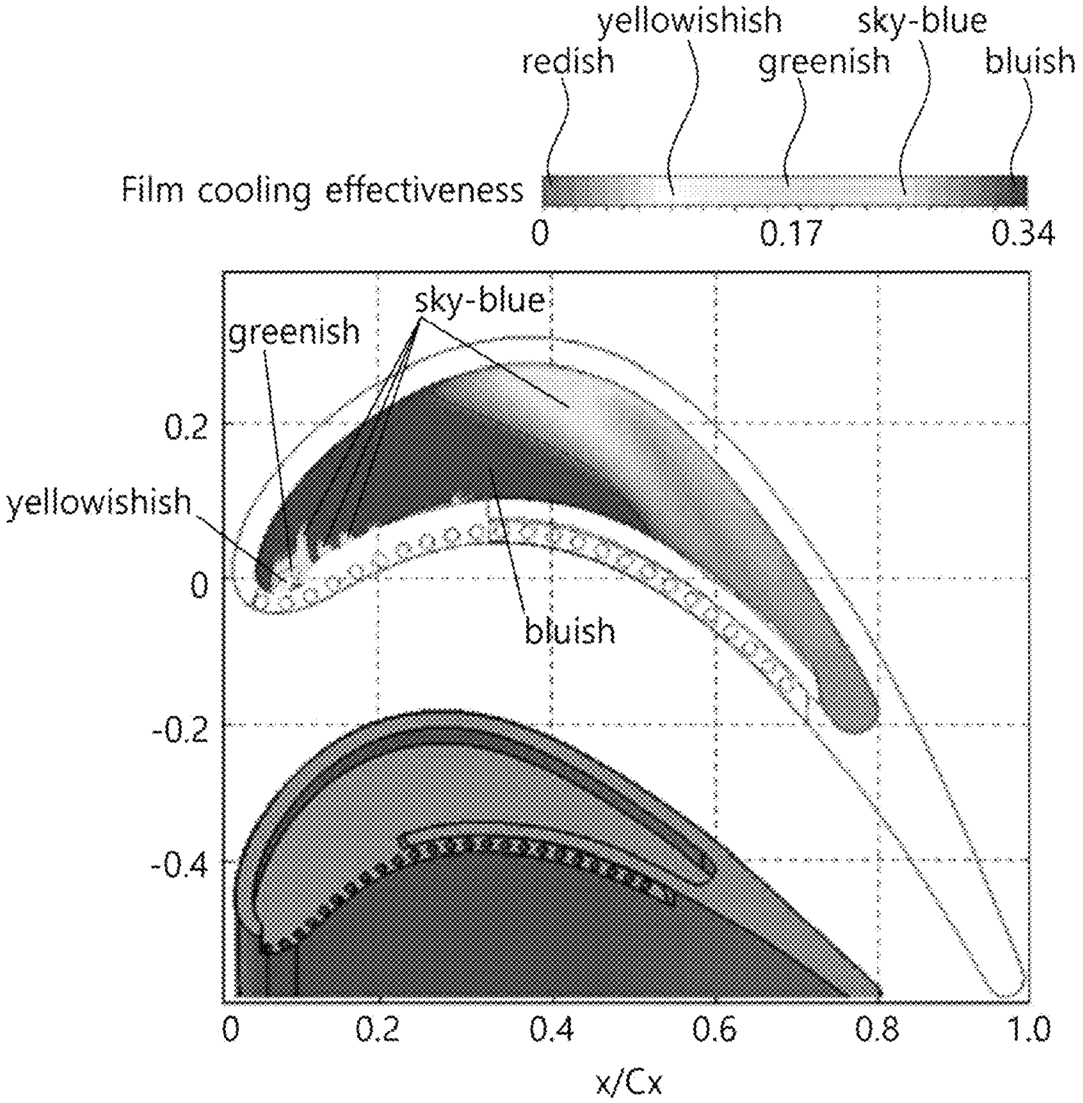
FIG. 11 is a view illustrating a tip-surface film-cooling effectiveness distribution diagram of the gas turbine blade having a shelf squealer tip of the present invention.

FIG. 11 is a view illustrating a tip-surface film-cooling effectiveness distribution diagram of the gas turbine blade having a shelf squealer tip of the present invention.

Figure 5:
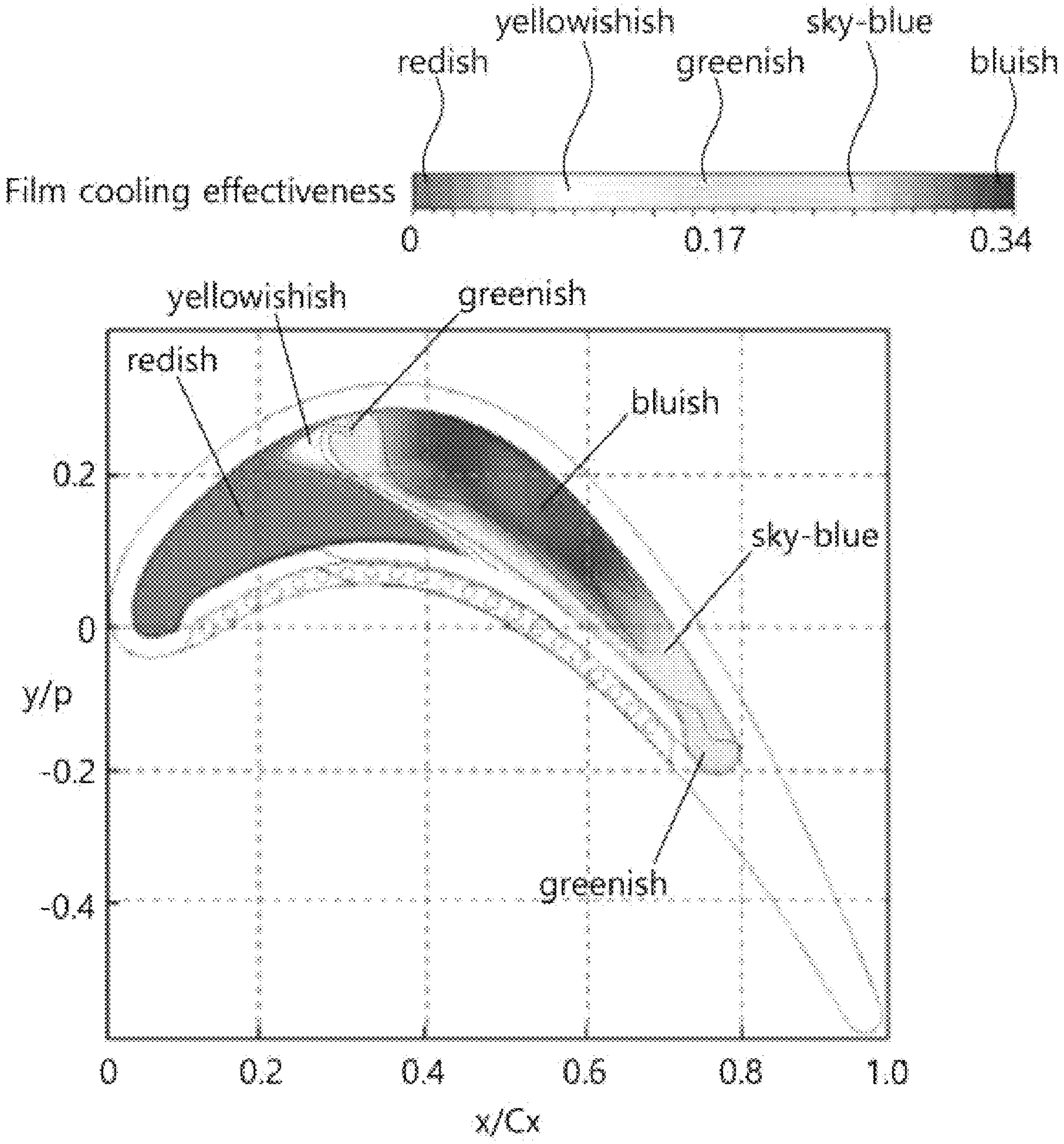
FIG. 5 (PRIOR ART)

In comparison with the related art illustrated in FIG. 5, in the related art, the high-temperature flow introduced into the tip surface forms a complicated vortex such as a swirl flow, which results in low film-cooling effectiveness in most regions, except for a part of the suction surface side. However, according to the present invention, the high-temperature flow is relatively less introduced because of the film-cooling fluid, such that high film-cooling performance is exhibited. In particular, it can be ascertained that the film-cooling effectiveness on the leading edge region, which is a region of the turbine blade in which the most thermal load is concentrated, is significantly improved in comparison with the related art.

Figure 12:
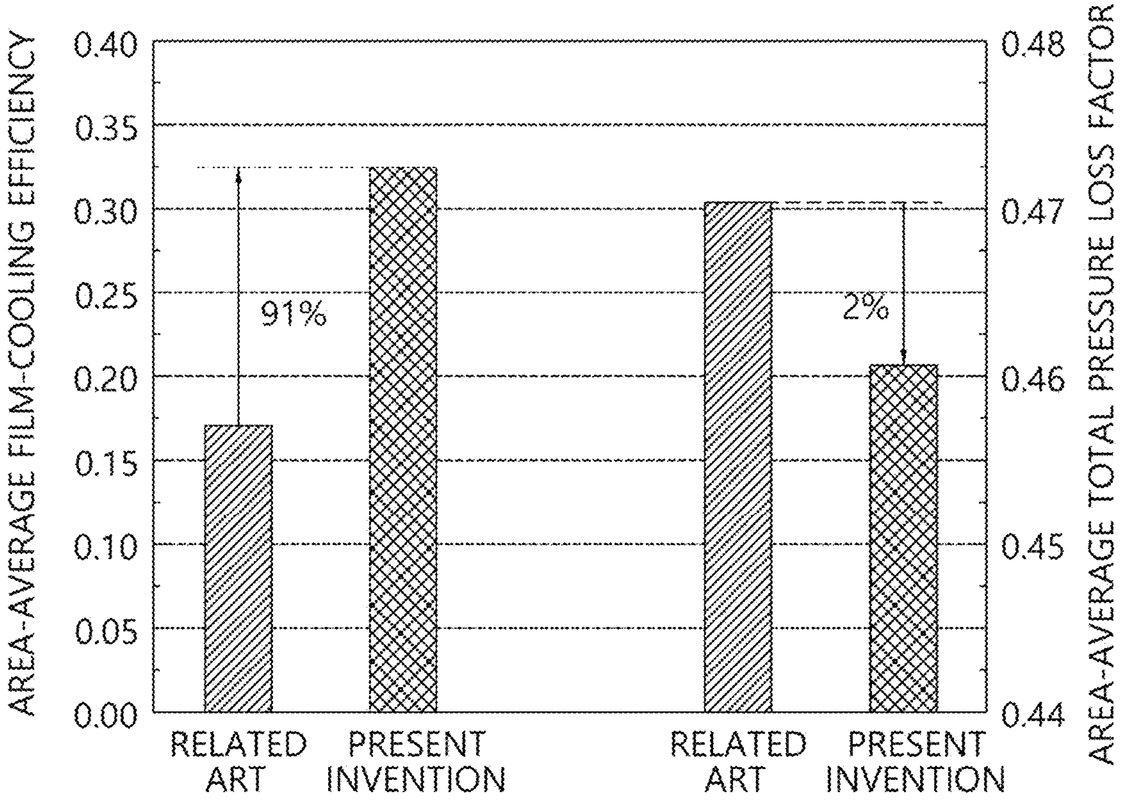
FIG. 12 is a view illustrating the comparison of averaged film-cooling effectiveness on the tip surface and total pressure loss coefficient at blade exit for the related art and the present invention.

Further, FIG. 12 is a view illustrating a comparison between the related art and the present invention in terms of the area-average film-cooling effectiveness on the tip surfaces and the average total pressure loss coefficient at the blade exit. According to the present invention to which the disconnected rim is applied, the average film-cooling effectiveness is improved by about 91% and the average total pressure loss coefficient is reduced by 2% in comparison with the related art. Therefore, in case that the present invention is applied to the turbine blade, it is expected that damage to the blade tip region is prevented by the improvement on cooling performance on the tip surface, the lifespan is improved, and the efficiency of the gas turbine is improved by the reduction in aerodynamic loss.

The present invention may additionally provide 1) a range of a length of the disconnected rim and a position at which the rim is disconnected, 2) a range of an angle of the non-disconnected rim, and 3) ranges of the number of, positions, and angles of the film-cooling holes disposed in the shelf region.

While the present invention has been described with reference to the exemplified drawings, it is obvious to those skilled in the art that the present invention is not limited to the aforementioned embodiments, and may be variously changed and modified without departing from the spirit and the scope of the present invention. Accordingly, the changed or modified examples belong to the claims of the present invention and the scope of the present invention should be interpreted on the basis of the appended claims.

| [Description of Reference Numerals] | |
|---|---|
| 110: Blade housing | |
| 111: Pressure surface | 112: Suction surface |
| 113: Tip surface | |
| 114: Leading edge | 115: Trailing edge |
| 116: Shelf portion | |
| 120: Squealer tip | |
| 121: Suction surface-side squealer tip | |
| 122: Pressure surface-side squealer tip | |
| 130: Cooling hole | |

The invention claimed is:

1. A gas turbine blade having a shelf squealer tip, the gas turbine blade comprising:

an airfoil-shaped blade housing; and a squealer tip extending from an edge portion of a tip surface that is an end surface of the blade housing, wherein the squealer tip is formed only on a part of the edge portion of the tip surface, wherein the squealer tip comprises:

a suction surface-side squealer tip extending from a side of the edge portion of the tip surface adjacent to a suction surface of the blade housing; and a pressure surface-side squealer tip extending from a side of the edge portion of the tip surface adjacent to a pressure surface of the blade housing, wherein the pressure surface-side squealer tip is formed only on a part of the tip surface at the side adjacent to the pressure surface, wherein a shelf portion, in which the pressure surface-side squealer tip is not formed, is formed at a side disposed adjacent to the pressure surface of the tip surface and provided from an end of a leading edge of the blade housing by a predetermined length, wherein the tip surface is opened laterally through the shelf portion formed at a same height as the tip surface, wherein the pressure surface-side squealer tip is formed to be spaced apart from the side of the tip surface adjacent to the pressure surface, and the pressure surface-side squealer tip is formed on a portion of the pressure surface side of the tip surface where the shelf portion is not formed, wherein the pressure surface-side squealer tip is formed to be inclined upward in a direction toward the pressure surface.

2. The gas turbine blade of claim 1, wherein a plurality of cooling holes is formed in the shelf portion.

3. The gas turbine blade of claim 2, wherein a plurality of cooling holes is formed in the tip surface in a section in which the pressure surface-side squealer tip is spaced apart from the side of the tip surface adjacent to the pressure surface.

* * * * *